United States Patent
Gonda et al.

(10) Patent No.: US 7,651,626 B2
(45) Date of Patent: Jan. 26, 2010

(54) HEXAGONAL FERRITE, ANTENNA USING THE SAME AND COMMUNICATION APPARATUS

(75) Inventors: Masayuki Gonda, Saitama (JP); Hiroyuki Aoyama, Saitama (JP)

(73) Assignee: Hitachi Metals, Ltd., Minato-ku, Tokyo (JP)

( * ) Notice: Subject to any disclaimer, the term of this patent is extended or adjusted under 35 U.S.C. 154(b) by 258 days.

(21) Appl. No.: 11/661,603

(22) PCT Filed: Dec. 14, 2006

(86) PCT No.: PCT/JP2005/022950
§ 371 (c)(1),
(2), (4) Date: May 23, 2007

(87) PCT Pub. No.: WO2006/064839
PCT Pub. Date: Jun. 22, 2006

(65) Prior Publication Data
US 2008/0036671 A1    Feb. 14, 2008

(30) Foreign Application Priority Data
Dec. 17, 2004  (JP)  ............................. 2004-365956
Mar. 31, 2005  (JP)  ............................. 2005-101899
Jun. 7, 2005   (JP)  ............................. 2005-166517

(51) Int. Cl.
*C04B 35/26*   (2006.01)
*H01F 1/34*    (2006.01)

(52) U.S. Cl. ................ 252/62.63; 252/62.62; 252/62.6; 252/62.61; 343/787

(58) Field of Classification Search .............. 252/62.63, 252/62.62, 62.61, 62.6; 343/787
See application file for complete search history.

(56) References Cited

U.S. PATENT DOCUMENTS

| 2002/0050309 A1* | 5/2002 | Marusawa ................... 148/306 |
| 2002/0156721 A1 | 10/2002 | Lyback et al. |
| 2003/0052299 A1 | 3/2003 | Umeda et al. |
| 2004/0183733 A1 | 9/2004 | Aoyama et al. |

FOREIGN PATENT DOCUMENTS

| JP | 49-40046 | 4/1974 |
| JP | 51-30389 | 3/1976 |
| JP | 52-126795 | 10/1977 |
| JP | 9-167703 | 6/1997 |
| JP | 10-242734 | 9/1998 |

(Continued)

OTHER PUBLICATIONS

International Search Report dated Jan. 31, 2006 with Partial English Translation.

*Primary Examiner*—C. Melissa Koslow
(74) *Attorney, Agent, or Firm*—McGinn IP Law Group, PLLC

(57) ABSTRACT

There is provided Y-type hexagonal ferrite having a high density of sintered body and a low level of loss and an antenna.

The hexagonal ferrite having Y-type ferrite as the main phase is characterized in that main components of the hexagonal ferrite are M1O (M1 stands for at least one of Ba and Sr), M2O (M2 stands for at least one of Co, Ni, Cu, Zn and Mn) and $Fe_2O_3$, and the loss factor and the density of sintered body are 0.15 or lower and $4.6 \times 10^3$ $kg/m^3$ or higher, respectively. The hexagonal ferrite is used to configure an antenna and a communication apparatus.

17 Claims, 3 Drawing Sheets

FOREIGN PATENT DOCUMENTS

| | | |
|---|---|---|
| JP | 2001-358516 | 12/2001 |
| JP | 2002-068830 | 3/2002 |
| JP | 2002-260912 | 9/2002 |
| JP | 2002-260914 | 9/2002 |
| JP | 2003-002656 | 1/2003 |
| JP | 2004-304783 | 10/2004 |
| WO | WO 96/15078 | 5/1996 |

\* cited by examiner

HEXAGONAL FERRITE, ANTENNA USING THE SAME AND COMMUNICATION APPARATUS

TECHNICAL FIELD

The present invention relates to magnetic material suitable for high frequency devices, and particularly to hexagonal ferrite suitable for use in a high frequency band ranging from several hundreds of MHz to several GHz, an antenna used in communication apparatuses, such as mobile phones, wireless LANs and digital broadcasting, and a communication apparatus.

BACKGROUND ART

In recent years, as miniaturized, high-speed, high-frequency electronic apparatuses have been introduced, circuit components used in such apparatuses need to have characteristics usable in a range from several hundreds of MHz to several GHz. For example, impedance elements for noise reduction need to maintain high impedance in the above high frequency band. As another example, communication apparatuses, such as mobile phones and wireless LANs, operate in a frequency band ranging from several hundreds of MHz to several GHz and need to be able to operate in a wide band and to have high efficiency in that band. Antennas used in such communication apparatuses also need to function with high gain in the above band in the first place, and need to be compact and low-profile from the viewpoint of their usage. Furthermore, in the digital terrestrial broadcasting, which has recently commenced, antennas to be used need to cover a wide frequency band ranging from 470 MHz to 770 MHz in order to receive all channels. In the present application, it is noted that the description of "a to b" means "equal to or greater than a and equal to or smaller than b."

As a compact, low-profile antenna suitable for the above-mentioned communication apparatuses, such as mobile phones, a so-called chip antenna based on dielectric material has been conventionally used (Patent Reference 1). At a fixed frequency, use of dielectric material with a higher dielectric constant allows reduction in the size of the chip antenna. There has also been proposed a chip antenna using magnetic material with high magnetic permeability as well as a high dielectric constant to reduce the size of the antenna (Patent Reference 2).

When magnetic material is used for a chip antenna, for example, spinel ferrite, such as Ni—Zn ferrite, has so-called Snoek's limit, which limits use of spinel ferrite in high frequency regions. In contrast, since hexagonal ferrite has an easy magnetization axis in a plane perpendicular to the c axis and hence maintains predetermined magnetic permeability even in a frequency b or higher than the frequency limit of spinel ferrite (Snoek's limit), so that hexagonal ferrite has been proposed as one of magnetic materials for chip antennas (Patent Reference 3). Patent Reference 3 discloses that Z-type ferrite in which most of particles have a single domain structure is particularly used in a high frequency region in an effective manner.

Although not particularly limited to the chip antenna application, Patent Reference 4 discloses, as a material for high frequency circuit components, magnetic oxide sintered body mainly made of Y-type hexagonal ferrite, occupying at least 80% of the composition, for the purpose of increasing the resistivity and lowering the dielectric constant. The magnetic oxide sintered body contains cobalt oxide, copper oxide and iron oxide as main components and AO (AO stands for at least one of BaO and SrO) for the remaining part, and also contains borosilicate glass and the like as sub-components.

Patent Reference 1: JP-A-2001-358516
Patent Reference 2: JP-A-49-40046
Patent Reference 3: WO 96/15078
Patent Reference 4: JP-A-2002-260912

DISCLOSURE OF THE INVENTION

Problems to be Solved by the Invention

Even in the compact, low-profile dielectric material-based chip antenna described above, when the antenna has a helically-wound emission electrode, line capacitance and hence the Q value increase as the number of winding increases. As a result, the bandwidth decreases and it becomes difficult to apply the chip antenna to applications that require wide bandwidths, such as digital terrestrial broadcasting. In contrast, use of magnetic material in place of dielectric material may prevent increase in the number of winding and provide a wider bandwidth compared to the case where dielectric material is used. However, when Z-type ferrite is used as the magnetic material, loss is large and the magnetic permeability starts decreasing at several hundreds of MHz, so that it is difficult to achieve satisfactory antenna characteristics in the frequency range of several hundreds of MHz or higher. When Y-type ferrite is used as the magnetic material, the loss is small and the magnetic permeability does not decrease even in the range of several GHz or higher, but the following problems occur. In general, while soft ferrite used for high frequency electronic components requires high volume resistivity, high strength is further required when the soft ferrite is used in communication apparatuses, such as mobile apparatuses, because impact may be applied when dropped, for example. A high density of sintered body is also required because low density of sintered body likely cause chipping when the material is machined. However, in the case of Y-type ferrite, it is difficult to achieve a high density of sintered body density and hence high strength, while preventing increase in loss. For example, simply controlling the sintering temperature or the like to increase the density of sintered body causes abnormal grain growth, resulting in degraded magnetic characteristics. For example, the magnetic oxide sintered body disclosed in JP-A-2002-260912 hardly solves the problem associated with the loss and also has a high dielectric constant, so that it is difficult to directly apply that material to antenna applications. The fact that it is difficult to achieve high density of sintered body while preventing increase in loss makes it difficult to apply Y-type ferrite not only to a chip antenna but also to other electronic apparatuses used in high frequency ranges. Therefore, there is a need for hexagonal ferrite having performance capable of meeting these application requirements.

An object of the invention is to provide hexagonal ferrite suitable for communication apparatuses, such as mobile apparatuses, and having an increased density of sintered body without increase in loss. Another object of the invention is to provide a wideband, high gain antenna and communication apparatus.

Means for Solving the Problems

The invention is hexagonal ferrite having Y-type ferrite as the main phase characterized in that main components of the hexagonal ferrite are M1O (M1 stands for at least one of Ba and Sr), M2O (M2 stands for at least one of Co, Ni, Cu, Zn and Mn) and $Fe_2O_3$, and the loss factor at a frequency of 1 GHz and the density of sintered body are 0.15 or lower and $4.6\times10^3$ kg/m³ or higher, respectively. The fact that the hexagonal ferrite has Y-type ferrite as the main phase as well as a low level of loss and a high density of sintered body provides hexagonal ferrite suitable for antennas that function in a wide band with high gain, excels in strength, and are used in high frequency communication apparatuses, such as mobile apparatuses. In the invention, the loss factor (tan δ) represents a loss factor when an alternate magnetic field is applied, and the values of the magnetic permeability (μ) and the loss factor are those at 1 GHz unless otherwise specified (the same applies to the following description).

The hexagonal ferrite described above preferably contains 0.1 to 0.8 weight parts of Li in terms of $Li_2CO_3$ with respect to 100 weight parts of the main components. Li provides an effect of increasing the density of sintered body. The Li content of the above-described range allows increased magnetic permeability while maintaining the loss at a low level, so as to provide hexagonal ferrite having a high density of sintered body, a low level of loss and high magnetic permeability. Smaller than 0.1 weight parts of Li in terms of $Li_2CO_3$ will not provide a sufficient effect of improving the density of sintered body, resulting in difficulty in achieving a density of sintered body of $4.6\times10^3$ kg/m³ or higher. On the other hand, greater than 0.8 weight parts of Li significantly lowers the magnetic permeability, resulting in magnetic permeability lower than that obtained when no Li is contained. The Li content is more preferably 0.4 to 0.6 weight parts in terms of $Li_2CO_3$, and by setting the Li content within that range, it is possible to achieve further superior hexagonal ferrite having a density of sintered body of $4.6\times10^3$ kg/m³ or higher, a loss factor of 0.15 or lower and a magnetic permeability of 2.5 or higher.

In the hexagonal ferrite described above, the M2 may be at least one of Co, Ni and Mn, and the hexagonal ferrite may contain 0.2 to 0.4 weight parts of Li in terms of $Li_2CO_3$ as well as 0.4 to 1.3 weight parts of Cu in terms of CuO or 0.2 to 2.3 weight parts of Zn in terms of ZnO with respect to 100 weight parts of the main components. Cu and Zn have an effect of improving the density of sintered body and the magnetic permeability without significantly lowering the loss factor. By containing Li in combination with Cu or Zn, it is possible to achieve hexagonal ferrite having a high density of sintered body, a low level of loss and high magnetic permeability. For example, it is possible to achieve a density of sintered body of $4.8\times10^3$ kg/m³ or higher, a loss factor of 0.08 or lower and a magnetic permeability of 2.5 or higher.

The hexagonal ferrite described above may contain 0.1 to 0.4 weight parts of Si in terms of $SiO_2$ as well as at least one of 0.1 to 0.8 weight parts of Na in terms of $Na_2CO_3$ and 0.1 to 0.8 weight parts of Li in terms of $Li_2CO_3$ with respect to 100 weight parts of the main components. Such a composition is suitable when high magnetic permeability is particularly required. Si has an effect of improving the density of sintered body and the magnetic permeability. The Na or Li content of the above-described range particularly lowers the loss and, in conjunction with the effect of Si that improves the magnetic permeability, can provide excellent hexagonal ferrite in terms of the density of sintered body, loss and magnetic permeability. Smaller than 0.1 weight parts of Na in terms of $Na_2CO_3$ or smaller than 0.1 weight parts of Li in terms of $Li_2CO_3$ will not provide a sufficient effect of reducing the loss, resulting in difficulty in achieving a loss factor of 0.15 or lower. On the other hand, greater than 0.8 weight parts of the above components significantly lowers the magnetic permeability, resulting in difficulty in achieving a magnetic permeability of 2.5 or higher. From the viewpoint of a low level of loss and high magnetic permeability, it is more preferable to set the Na content to 0.3 to 0.6 weight parts in terms of $Na_2CO_3$ or the Li content to 0.3 to 0.6 weight parts in terms of $Li_2CO_3$. By setting the Na or Li content within that range, it is possible to provide low-loss hexagonal ferrite having a loss factor of 0.1 or lower. Disadvantageously, smaller than 0.1 weight parts of Si in terms of $SiO_2$ will not provide a sufficient effect of improving the magnetic permeability, while greater than 0.4 weight parts of Si significantly increases the loss even when Na or Li is contained in combination with Si. Therefore, to achieve a loss factor of 0.15 or lower and a magnetic permeability of 2.5 or higher by containing Na or Li in combination with Si, the Si content is desirably 0.1 to 0.4 weight parts in terms of $SiO_2$.

The antenna of the invention is characterized in that it includes a base using the hexagonal ferrite described above and at least one electrode pressed on the surface of the base and/or in the base. Use of the hexagonal ferrite described above as the base of the antenna can achieve a wideband, high gain antenna.

Furthermore, in the antenna described above, the hexagonal ferrite preferably has a magnetic permeability of 2.5 or higher at a frequency of 1 GHz and a dielectric constant of 6 or lower. Such composition can provide a wideband, high strength antenna compared to the case where dielectric material is used as the base. This also contributes to reduction in size of the antenna. The dielectric constant (∈) is the value at 1 GHz (the same applies to the following description).

The communication apparatus of the invention is characterized in that it uses the antenna described above. Use of the antenna described can provide a wideband, high efficiency communication apparatus.

The hexagonal ferrite described above preferably contains 0.1 to 1.5 weight parts of Cu in terms of its oxide with respect to 100 weight parts of the main components and has a loss factor of 0.05 or lower at a frequency of 1 GHz. In the hexagonal ferrite having Y-type ferrite as the main phase, the Cu content of the above range in terms of its oxide, that is, CuO, allows a loss factor of 0.05 or lower at a high frequency of 1 GHz as well as a high density of sintered body. Such composition is suitable when a low level of loss is particularly required. Therefore, it is possible to provide hexagonal ferrite that effectively functions particularly in a high frequency band of several hundreds of MHz or higher. Smaller than 0.1 weight parts of CuO will not provide a sufficient effect of improving the density of sintered body, while greater than 1.5 weight parts of CuO will increase the loss factor and lower the volume resistivity. The Cu content is more preferably 0.1 to 0.6 weight parts in terms of CuO. By setting the Cu content within that range, it is possible to achieve hexagonal ferrite that further excels in loss, density of sintered body and magnetic permeability and has high volume resistivity.

The hexagonal ferrite described above preferably contains 0.1 to 1.0 weight parts of Zn in terms of its oxide with respect to 100 weight parts of the main components to achieve a loss factor of 0.05 or lower at a frequency of 1 GHz. In the hexagonal ferrite having Y-type ferrite as the main phase, the Zn content of the above range in terms of its oxide, that is, ZnO, allows a loss factor of 0.05 or lower at a high frequency of 1 GHz as well as a high density of sintered body. Such composition is also suitable when a low level of loss is particularly required. Therefore, it is possible to provide hexagonal ferrite that effectively functions particularly in a high frequency band of several hundreds of MHz or higher Smaller than 0.1 weight parts of ZnO will not provide a sufficient effect of improving the density of sintered body, while greater than 1.0 weight parts of ZnO will increase the loss factor and lower the volume resistivity. The Zn content is more preferably 0.1 to 0.6 weight parts in terms of ZnO. By setting the Zn content within that range, it is possible to achieve hexagonal ferrite that further excels in loss, density of sintered body and magnetic permeability and has a high volume resistivity.

The hexagonal ferrite described above preferably has a volume resistivity of $1 \times 10^5$ Ωm or higher. By setting the volume resistivity within the above-described range, it is possible to ensure insulating property when electronic components are configured by using the hexagonal ferrite. From that point of view, the volume resistivity is more preferably $1 \times 10^6$ Ωm or higher.

The antenna of the invention is characterized in that it includes base using the hexagonal ferrite described above and at least one electrode pressed on the surface of the base and/or in the base. Use of the hexagonal ferrite described above as the base of the antenna can achieve a wideband, high gain antenna.

Furthermore, in the antenna described above, the hexagonal ferrite preferably has a dielectric constant of 6 or lower and a density of sintered body of $4.8 \times 10^3$ kg/m$^3$ or higher. Such composition can provide a wideband, high strength antenna compared to the case where dielectric material is used as the base.

The communication apparatus of the invention is characterized in that it uses the antenna described above. Use of the antenna described above can provide a wideband, high efficiency communication apparatus.

EFFECT OF THE INVENTION

According to the invention, it is possible to provide hexagonal ferrite material that has an excellent loss factor particularly in a high frequency band of several hundreds of MHz or higher as well as an excellent density of sintered body and allows manufacture of electronic components, such as antennas, choke coils and noise reduction elements, used in high frequency bands ranging from several hundreds of MHz to several GHz. In particular, an antenna using the hexagonal ferrite according to the invention can be made of magnetic material having a high density of sintered body and a low level of loss as the base, allowing a high strength, high gain, wideband antenna to be provided.

BEST MODE FOR CARRYING OUT THE INVENTION

An embodiment of the invention will be further described. In the hexagonal ferrite of this embodiment, the main phase is Y-type ferrite. A representative example of Y-type ferrite is soft hexagonal ferrite expressed by the chemical formula of $Ba_2CO_2Fe_{12}O_{22}$. In this embodiment, the main components are M1O (M1 stands for at least one of Ba and Sr), M2O (M2 stands for at least one of Co, Ni, Cu, Zn and Mn) and $Fe_2O_3$. Other examples of Y-type ferrite of this embodiment are Y-type ferrite expressed by a chemical formula similar to the above except that Ba is replaced with Sr and Y-type ferrite expressed by a chemical formula similar to the above except that Co is replaced with Ni, Cu, Zn, Mn or Fe. Any one of these materials maintains the magnetic permeability up to a high frequency band. Although the content of each of the components is not limited to a specific value as far as the main phase is Y-type ferrite, it is preferable to contain, for example, 20 mol % to 23 mol % of BaO, 17 mol % to 21 mol % of CoO and $Fe_2O_3$ for the remaining part, more desirably 20 mol % to 20.5 mol % of BaO, 20 mol % to 20.5 mol % of CoO and $Fe_2O_3$ for the remaining part. To achieve a low loss factor, the Cu content and the Zn content are preferably small. For example, to achieve a loss factor of 0.1 or lower, the content of each of the elements is preferably 5 mol % or lower. Although the hexagonal ferrite of this embodiment is preferably of Y-type single phase, other hexagonal ferrite, such as Z-type and W-type, and secondary phases, such as $BaFe_2O_4$, are sometimes pressed. Therefore, in this embodiment, although the main phase is Y-type ferrite, heterogeneous phases thereof may be contained. However, to maintain the magnetic permeability up to high frequency ranges and to lower the loss, the ratio of Y-type ferrite is preferably 85% or higher, more preferably 92% or higher. The ratio of Y-type ferrite refers to the ratio of the main peak (the peak having the highest peak intensity) intensity of Y-type ferrite obtained in X-ray diffraction to the sum of main peak intensities of each phase of which the ferrite of this embodiment is composed.

In this embodiment, the main phase is the above-described Y-type hexagonal ferrite. Another known example of hexagonal ferrite that is not limited to the Snoek's limit associated with spinel ferrite is Z-type ferrite having high magnetic permeability. However, the magnetic permeability of Z-type ferrite starts decreasing at several hundreds of MHz and its loss factor is also high.

In contrast, Y-type ferrite excels in high frequency characteristics, for example, its magnetic permeability remains substantially unchanged up to the frequency range of 10 GHz or higher. The Y-type ferrite having a loss factor of 0.15 or lower and a density of sintered body of $4.6 \times 10^3$ kg/m$^3$ or higher is suitable for a chip antenna used in communication apparatuses, such as mobile apparatuses. The density of sintered body of $4.6 \times 10^3$ kg/m$^3$ or higher allows a high-strength chip antenna to be provided. Such a chip antenna is suitable for mobile apparatuses prone to impact. When the density of sintered body is lower than $4.6 \times 10^3$ kg/m$^3$, the strength of the sintered body greatly lowers. From the viewpoint of the strength, the density of sintered body is more preferably $4.8 \times 10^3$ kg/m$^3$ or higher. To achieve a compact, wideband magnetic material-based chip antenna, the magnetic permeability is preferably high. However, to allow a chip antenna to exhibit sufficient performance, such as high gain, it has been found that the loss factor particularly needs to be low. From this point of view, for a chip antenna used in a high frequency range of several hundreds of MHz or higher, the loss factor is preferably 0.15 or lower even at 1 GHz, preferably 0.1 or lower, more preferably 0.08 or lower, still more preferably 0.05 or lower, most preferably 0.03 or lower.

Furthermore, provided that the predetermined level of the loss factor and the density of sintered body is satisfied, (1) the magnetic permeability can be particularly increased by containing Li, moreover, adding Cu and/or Zn in addition to Li, still moreover, containing Si and at least one of Na and Li, and (2) the loss can be particularly reduced by containing Cu and/or Zn. Such composition particularly allows higher performance of a high-frequency chip antenna. The hexagonal ferrite according to this embodiment having high magnetic permeability and a low loss factor is not limited to the chip antenna application, but can of course be applied to other electronic components, such as inductance elements. Since the hexagonal ferrite according to this embodiment can be used as a bulk material entirely made of ferrite, higher volume resistivity, a higher insulating property and lower eddy current loss can be achieved compared to the case where the hexagonal ferrite is used in the press of a film.

Firstly, a description will be made of composition for particularly increasing the magnetic permeability as described in (1). Addition of Li, even added alone, may exhibit an effect of improving the density of sintered body and may contribute to improvement in mechanical strength. Addition of Li, even added alone, also reduces the loss and exhibits an effect of improving the magnetic permeability. Containing at least one of Na and Li along with Si is one of the features of this embodiment. Containing Na and/or Li as described above particularly exhibits a significant effect of reducing the loss, and by setting the content of each of these elements within the range according to this embodiment, a high density of sintered body, a low level of loss and high magnetic permeability can be achieved. It is noted that Na provides the effect when Na is added in combination with Si. Although Na added alone will not sufficiently increase the density of sintered body or the magnetic permeability, adding Na in combination with Si solves this problem and achieves a high density of sintered body, a low level of loss and high magnetic permeability. Containing Si exhibits an effect of improving the density of sintered body. Containing Si also exhibits an effect of improving the magnetic permeability. This approach is therefore suitably applied to the chip antenna application and the like where high strength is particularly required. The improvement in magnetic permeability is attained by containing at least 0.1 weight parts of Si in terms of $SiO_2$ with respect to 100 weight parts of the main components. Containing such amount of Si may improve the density of sintered body by at least 5% compared to the case where no Si is added. The density of sintered body can be increased to at least $4.8\times10^3$ $kg/m^3$ when only Si is contained and at least $4.6\times10^3$ $kg/m^3$ when Si is contained in combination with Na. It is noted, however, that the upper limit of the Si content is 0.4 weight parts or lower. The reason of this is that when Na and/or Li is contained according to the range of this embodiment, Na and Li significantly contribute to the effect of reducing the loss, allowing a greater amount of Si to be contained, and too much Si content results in significant increase in the loss factor. Furthermore, from the viewpoint of maintaining the loss factor of 0.1 or lower, it is preferable to contain at least ¾ mass parts of $Na_2CO_3$ or $Li_2CO_3$ with respect to 1 mass part of $SiO_2$.

Furthermore, containing Na and/or Li has an effect of suppressing the generation of heterogeneous phases. Containing 0.1 weight parts of Na or the like can reduce the percentage of heterogeneous phases, which is determined from a main peak intensity ratio obtained by an X-ray diffraction analysis, by 25%, while containing 0.2 weight parts of Na or the like can reduce the percentage of heterogeneous phases by 50%. In addition to Na and/or Li, alkali metal elements, such as K, can be contained.

In addition to Li, Cu or Zn may be contained. By containing 0.2 to 0.4 weight parts of Li in terms of $Li_2CO_3$ and 0.4 to 1.3 weight parts of Cu in terms of CuO or 0.2 to 2.3 weight parts of Zn in terms of ZnO, hexagonal ferrite having the high density of sintered body, a low level of loss and high magnetic permeability is achieved. Cu and Zn have an effect of improving the density of sintered body and the magnetic permeability without significantly lowering the loss factor. For example, it is possible to achieve a density of sintered body of $4.8\times10^3$ $kg/m^3$ or higher, a loss factor of 0.08 or lower and a magnetic permeability of 2.5 or higher. In this case, the Li content smaller than 0.2 weight parts in terms of $Li_2CO_3$ will not exhibit the effect of improving the magnetic permeability, while the Li content greater than 0.4 weight parts results in an increased loss factor and reduced magnetic permeability. When the amount of Cu or Zn, which will be contained in combination with Li, is smaller than the above-described range, the density of sintered body will not sufficiently improve, while the amount exceeding the above-described range will lower the magnetic permeability.

Next, a description will be made of composition for particularly reducing the loss as described in (2). In this composition, the main phase is Y-type hexagonal ferrite and a trace amount of Cu or Zn is contained. There have been known $Cu_2Y$, $Zn_2Y$ and the like obtained by replacing Co in Y-type ferrite with Cu or Zn. Although the replacement of Co with Cu or Zn is primarily intended to perform low-temperature sintering for the purpose of co-firing with Ag and improve the magnetic permeability, the amount of Cu or Zn that replaces Co is as large as several tens of percent or larger. In this case, the volume resistivity is likely reduced and the loss factor and the dielectric constant are likely increased. In contrast, a trace amount of Cu or Zn is contained in this embodiment. By containing a trace amount of Cu or Zn, it is possible to lower the loss factor and improve the density of sintered body while maintaining high volume resistivity. Adding a trace amount of Cu or Zn also improves the magnetic permeability. By setting the Cu content to 0.1 to 1.5 weight parts in terms of CuO or the Zn content to 0.1 to 1.0 weight parts in terms of ZnO, a density of sintered body of $4.8\times10^3$ $kg/m^3$ or higher can be achieved. In particular, by setting the Cu content or the Zn content within the above range of the trace amount, it is possible to ensure a loss factor of 0.05 or lower at a frequency of 1 GHz and a volume resistivity of $1\times10^5$ $\Omega m$ or higher. The Cu content or the Zn content is more preferably 0.1 to 0.6 weight parts in terms of the oxide thereof. By setting the Cu content or the Zn content within that range, the volume resistivity can be $1\times10^6$ $\Omega m$ or higher. It is also possible to ensure a loss factor of 0.03 or lower. When Cu or Zn is added as described above, from the viewpoint of achieving a low loss factor, M2, which is part of the main components, is preferably at least one of Co, Ni and Mn, and M2 is more preferably Co. It can be said that the hexagonal ferrite according to this embodiment having a high density of sintered body, which leads to improvement in sintered body strength, is suitable for a chip antenna used in communication apparatuses, such as mobile phones. Since the fact that the loss factor at a frequency of 1 GHz is 0.05 or lower contributes to increase in bandwidth of a chip antenna, for example when magnetic material is used to configure a chip antenna, the hexagonal ferrite having the above-described characteristics is suitable for a chip antenna from that viewpoint as well. The high volume resistivity described above is a characteristic required for high frequency electronic components as well as chip antennas from the viewpoint of ensuring an insulating property between electrodes and suppression of high-frequency loss. Such requirements can also be satisfied by this embodiment in which a trace amount of Cu or Zn is contained. When a chip antenna is configured by using the hexagonal ferrite, a volume resistivity of lower than $1\times10^5$ $\Omega m$ affects and reduces the gain of the chip antenna. Therefore, the volume resistivity is preferably $1\times10^5$ $\Omega m$ or higher, most preferably $1\times10^6$ $\Omega m$ or higher. It is noted that Cu and Zn may be contained in combination.

In addition to Cu and Zn, Si, Na, Mn and the like can also be contained. Although Si provides an effect of improving the density of sintered body and the magnetic permeability, containing smaller than 0.1 weight parts of Si in terms of $SiO_2$ will not effectively exhibit the effect, while increased Si content will increase the loss factor. Therefore, the Si content is preferably 0.1 to 0.4 weight parts. Although Na provides an effect of lowering the loss factor, containing smaller than 0.1 weight parts of Na in terms of $Na_2CO_3$ will not effectively exhibit the effect, while containing greater than 0.4 weight parts of Na will lower the volume resistivity. Therefore, the Na content is preferably 0.1 to 0.4 weight parts in terms of $Na_2CO_3$. Furthermore, although Mn provides an effect of lowering the loss factor, containing smaller than 0.1 weight parts of Mn will not effectively exhibit the effect, while containing greater than 1.0 weight part of Mn will lower the volume resistivity. Therefore, the Mn content is preferably 0.1 to 1.0 weight part in terms of $Mn_3O_4$.

The hexagonal ferrite according to this embodiment can be manufactured by a powder-metallurgical method that has been conventionally applied to soft ferrite manufacturing. Raw material, such as $BaCO_3$, $CO_3O_4$ and $Fe_2O_3$, and trace amounts of components, such as $Na_2CO_3$, $Li_2CO_3$, $SiO_2$, CuO and ZnO, each of which is weighed to be an intended percentage, are mixed. Although the mixing method is not limited to a specific one, for example, a ball mill or the like is used to mix wetly the above components along with purified water as a medium (for 4 to 20 hours, for example). Then, an electric furnace, a rotary kiln or the like is used to calcine the resultant mixed powder at a predetermined temperature into calcined powder. The calcination temperature and the keeping time are preferably 900 to 1300° C. and 1 to 3 hours, respectively. When the calcination temperature is lower and/ or the keeping time is shorter than the above values, the reaction will not sufficiently proceed, while the temperature and/or the time exceeds the above values, the grinding efficiency will decrease. The calcination atmosphere preferably includes oxygen, for example, in the air or in oxygen. An attriter a ball mill or the like is used to grind wetly the resultant calcined powder, and a binder, such as PVA (Poly-Vinyl-Alcohol), is added, followed by granulation using a spray dryer or the like so as to press granulated powder. The average particle size of the ground powder is preferably 0.5 µm to 5 µm. Then, a pressing machine is used to press the resultant granulated powder, and an electric furnace or the like is used to sinter the pressed powder, for example, at 1200° C. for 1 to 5 hours in an oxygen atmosphere to obtain hexagonal ferrite. The sintereing temperature is preferably 1100° C. to 1300° C. When the sintering temperature is lower than 1100° C., sintering will not sufficiently proceed so that high density of sintered body will not be achieved, while a sintering temperature higher than 1300° C. will result in over-sintering, for example, thereby generating exaggerated grains. When the sintering lime is short, the sintering process will not sufficiently proceed, while long sintering time likely results in over-sintering. Therefore, the sintering time is desirably 1 to 5 hours. To achieve a high density of sintered body, it is preferable to carry out the sintering under the presence of oxygen, that is, more preferably in an oxygen atmosphere. The resultant sintered body undergoes machining, such as cutting, as required.

Use of the above-described hexagonal ferrite to configure a chip antenna allows the chip antenna to achieve a wide bandwidth. To increase the bandwidth, it is necessary to lower the Q value of the chip antenna. Letting L be inductance and C be capacitance, the Q value is expressed by $(C/L)^{1/2}$. Therefore, it is necessary to increase L and lower C to increase the bandwidth. Use of dielectric material as the base requires increasing the number of winding in order to increase the inductance L. However, increasing the number of winding causes increased line capacitance, so that the Q value of the chip antenna cannot be effectively lowered. In contrast, use of magnetic material can increase the inductance L by means of magnetic permeability without increasing the number of winding, so that the Q value can be lowered without increasing the line capacitance caused by the increased number of winding, allowing increase in the bandwidth of the chip antenna. In particular, Y-type ferrite whose magnetic permeability can be maintained up to a GHz band can be used to increase the bandwidth of a chip antenna used in the range of several hundreds of MHz or higher. Therefore, the hexagonal ferrite according to this embodiment exhibits a superior characteristic on a high frequency side and can be suitably used for a chip antenna that operates in a band of 400 MHz or higher, or even higher than 1 GHz.

As described above, to allow a chip antenna to exhibit its sufficient performance, such as high gain, the loss factor particularly needs to be small. From this point of view, for a chip antenna used in a high frequency range of several hundreds of MHz or higher, the loss factor of the hexagonal ferrite to be used is preferably 0.15 or lower even at 1 GHz, more preferably 0.1 or lower. More preferably, a loss factor of 0.08 or lower, still more preferably 0.05 or lower, most preferably 0.03 or lower is used to achieve a chip antenna having more excellent gain. In a dielectric material-based chip antenna, while dielectric material with a dielectric constant of about 10 or higher has been conventionally used, use of the hexagonal ferrite according to this embodiment as the base allows the dielectric constant at 1 GHz to be 6 or lower, more preferably 5 or lower, while the loss factor is maintained at as low as 0.15 or lower, which contributes to higher gain and a wider bandwidth of a chip antenna and a communication apparatus. When the dielectric constant of the hexagonal ferrite exceeds 6, the line capacitance of a chip antenna configured by using the hexagonal ferrite disadvantageously increases. Use of hexagonal ferrite having a dielectric constant of 6 or lower and a high density of sintered body of $4.6\times10^3$ $kg/m^3$ or higher described above as the base allows a chip antenna to achieve a wide bandwidth and high strength compared to the case where dielectric is used as the base. The hexagonal ferrite according to this embodiment that exhibits a high magnetic permeability of 2.5 or higher is suitable for reducing the size and enables a chip antenna to operate in a wide band. For example, when the base made of the hexagonal ferrite and windings are used to configure a helical antenna, the number of winding can be reduced. Furthermore, there is also provided an advantage of easily adjusting the resonant frequency to be on the low frequency side. On the other hand, the hexagonal ferrite according to this embodiment having a density of sintered body of $4.8\times10^3$ $kg/m^3$ or higher is particularly suitable for providing a high-strength chip antenna.

The shape of the base is preferably a box shape from the viewpoint of stability and the like when the base is mounted. The dimension of the base is preferably 30 mm or shorter in length, 10 mm or smaller in width and 5 mm or lower in height. Base having dimensions exceeding the above ranges results in a disadvantageously large surface-mount-type chip antenna. An example of the electrode may be a helical electrode provided on the surface of the base such that the direction of the windings coincides with the longitudinal direction of the base Such a configuration can provide high inductance. Conversely, when the inductance remains unchanged, a compact configuration can be achieved without significant increase in line capacitance. In this case, the wire is wound at a predetermined pitch and electrode width to press one electrode. While the pitch and the electrode width are determined as appropriate according to required antenna characteristics, in order to prevent increase in line capacitance, it is preferable to sufficiently separate the electrodes, taking into account that the base will not be large. For example, it is desirable to set the inter-electrode distance to 0.4 mm to 1 mm and the electrode width to 0.4 mm to 1 mm. Furthermore, by changing the inter-electrode distance in one helical electrode, the bandwidth can be further increased. Regarding the electrode, while one electrode may be pressed as in the helical electrode described above, two helical electrodes may be pressed for a dual-band antenna. Moreover, another electrode may be separately provided for the purposes of grounding and fixing. Alternatively, a planar antenna may be configured by sandwiching the base between electrodes. Still alternatively, a lamination process is used to provide an electrode inside the base. An example of how to configure an antenna device follows: A chip antenna having the helical electrode described above pressed thereon is fixed on a circuit substrate. One end of the helical electrode is open, while the other end is connected to a feeding electrode of the circuit substrate. Then, the feeding electrode in connected to a high frequency power supply to press the antenna device.

The chip antenna described above is used to press, for example, the antenna device described above, which is then used in communication apparatuses. For example, the chip antenna described above can be used in communication apparatuses, such as mobile phones, wireless LANs, and digital terrestrial broadcasting, and can meet requirements of these apparatuses in terms of wide bandwidth and high efficiency. FIG. 3 shows an example where a mobile phone is used as the communication apparatus. In FIG. 3(B) showing the exterior of the unfolded mobile phone, the position of the built-in chip antenna is indicated by the dotted line. As shown in the cross-sectional view of FIG. 3(A), the mobile phone 6 is configured such that the chip antenna 3 is mounted on a substrate 4 and connected to a wireless module 5. The layout of the chip antenna 3 is not limited to the press shown in FIG. 3. The chip antenna 3 may be disposed on the opposite end side of an operation unit 6A, or may be disposed in a display unit 6B.

An example of how to manufacture a chip antenna using the hexagonal ferrite according to this embodiment follows: Hexagonal ferrite sintered body having a predetermined shape and a predetermined dimension is used as the base. For example, on the box-like base, conductive material is used to press an electrode having a predetermined pattern. The method for pressing the electrode is not limited to a specific one, but various film pressing methods may be used. For example, the electrode may be pressed by winding a conductive tape or wire, printing/sintering conductive paste material, plating, vapor deposition or sputtering. Alternatively, green sheets can be laminated into bulk material to press the base. In this case, an electrode can be printed on a green sheet to press an electrode in the bulk material. For example, a predetermined electrode pattern and via holes are pressed in green sheets containing hexagonal ferrite powder and binder material, and the sheets are laminated, followed by sintering the entire structure so as to achieve an antenna with a helical electrode disposed in the base. Examples of the conductive material to be used can be Ag, Ag—Pd, Ag—Pt, Cu, Au and Ni. The electrode pattern is selected as appropriate according to specification requirements.

This embodiment will now be specifically described with reference to examples, but is not limited to the following examples. Examples 1 to 4 illustrate an exemplary composition particularly for increasing the magnetic permeability as described in (1), while Examples 5 to 7 illustrate an exemplary composition particularly for reducing the loss as described in (2).

COMPARISON EXAMPLES

Firstly, $Fe_2O_3$, $BaCO_3$ and $CO_3O_4$ were weighed such that each oxide magnetic material had a predetermined composition shown in Table 1, and then $SiO_2$ was added in the amount indicated in Table 1 with respect to 100 weight parts of the main components, followed by mixing the thus weighed components in a wet ball mill using water as a medium for 16 hours.

After the mixed powder was dried, specimens No. 1 to 5 were calcined in the air at 1000° C. for 2 hours, while specimen No. 6 was calcined in the air at 1100° C. for 2 hours. The resultant calcined powder was ground in the wet ball mill using water as a medium for 18 hours. A binder (PVA) in the amount of 1% was added to the resultant ground powder for granulation. Upon granulation, the resultant granules were compressed into a ring shape. Thereafter, the specimens No. 1 to 5 were sintered in the oxygen atmosphere at 1200° C. for 3 hours, while the specimen No. 6 was sintered in an oxygen atmosphere at 1300° C. for 3 hours. The resultant ring-shaped sintered body having an outer diameter of 7.0 mm, an inner diameter of 3.5 mm and a height of 3.0 mm underwent a process of measuring the density of sintered body, the magnetic permeability $\mu$ and the loss factor tan $\delta$ at 25° C. The dielectric constant $\in$ was also measured.

The evaluation results of the density of sintered body as well as the magnetic permeability $\mu$ the loss factor tan $\delta$ and the dielectric constant $\in$ at a frequency of 1 GHz are shown. The density measurement was carried out by using a water displacement method, and the magnetic permeability $\mu$ and the loss factor tan $\delta$ were measured by using an impedance gain/phase analyzer (Model 4291B, Yokogawa-Hewlett-Packard, Ltd.). The dielectric constant $\in$ was measured by using a network analyzer (Model E8364A, Agilent Technologies, Inc.).

TABLE 1

| No. | | main component (mol %) | | | $SiO_2$ (Weight part) | Density × $10^3$ (kg/m³) | Magnetic permeability $\mu$ (1 GHz) | Loss factor tan$\delta$ (1 GHz) | Dielectric constant $\epsilon$ (1 GHz) |
|---|---|---|---|---|---|---|---|---|---|
| | | $Fe_2O_3$ | $BaCO_3$ | $Co_3O_4$ | | | | | |
| 1 | Comparison example | 60.0 | 20.0 | 20.0 | 0.2 | 5.09 | 3.4 | 0.18 | 5.4 |
| 2 | Comparison example | 60.0 | 20.0 | 20.0 | 0.4 | 5.22 | 3.4 | 0.18 | 5.1 |
| 3 | Comparison example | 60.0 | 20.0 | 20.0 | — | 4.52 | 2.1 | 0.01 | 4.5 |
| 4 | Comparison example | 60.0 | 20.0 | 20.0 | 0.6 | 5.25 | 3.7 | 0.21 | 5.1 |
| 5 | Comparison example | 60.0 | 20.0 | 20.0 | 0.8 | 5.27 | 4.0 | 0.24 | 5.0 |
| 6 | Comparison example | 70.6 | 17.6 | 11.8 | — | 4.45 | 7.5 | 0.90 | 4.5 |

As a result of an X-ray diffraction study performed on the specimens No. 1 to 5, the ratio of the peak intensity of Y-type ferrite to the sum of main peak intensities of the constituent phases was 90% to 100%, indicating that the main phase was the Y-type ferrite. On the other hand, the specimen No. 6 showed that the ratio of the peak intensity of Z-type ferrite to the sum of main peak intensities of the constituent phases was 98%, indicating that the main phase was the Z-type ferrite. As shown in Table 1, the specimen No. 3, to which no $SiO_2$ was added, showed a low density of sintered body of $4.52 \times 10^3$ kg/m$^3$ and a low magnetic permeability $\mu$ of 2.1, indicating that the mechanical strength and the high-frequency material characteristic were insufficient. By adding $SiO_2$ to the Y-type ferrite, the density of sintered body and the magnetic permeability $\mu$ were improved. By setting the amount of $SiO_2$ with respect to 100 weight parts of the main components within the range according to this embodiment, that is, at least 0.1 weight parts but smaller than 0.5 weight parts, a magnetic permeability $\mu$ of 2.5 or higher at 1 GHz and a loss factor tan $\delta$ of 0.2 or lower were achieved, indicating significantly lower loss compared to the Z-type ferrite and significant improvement in the magnetic permeability $\mu$ compared to the No. 3 Y-type ferrite, to which no $SiO_2$ added. However, the loss factors tan $\delta$ were higher than 0.15. For the sintered body specimens whose amount of $SiO_2$ was 0.2 weight parts, 0.4 weight parts and 0.6 weight parts, their fractured surfaces were observed under a SEM (Scanning Electron Microscope), and three, eight and six crystal grains per 100 $\mu$m by 100 $\mu$m area, each having a maximum diameter of 20 $\mu$m or greater, were observed, respectively.

Example 1

$Fe_2O_3$, $BaCO_3$, $SrCO_3$, $CO_3O_4$ and NiO were weighed such that each oxide magnetic material had a predetermined composition shown in Table 2, and then $SiO_2$, $Na_2CO_3$, $Li_2CO_3$ and $Mn_3O_4$ were added in the amounts indicated in Table 2 with respect to 100 weight parts of the main components, followed by mixing the thus weighed components in the wet ball mill using water as a medium for 16 hours.

The mixed powder was dried and then calcined in the air at 1000° C. for 2 hours. The resultant calcined powder was ground in the wet ball mill using water as a medium for 18 hours. The binder (PVA) in the amount of 1% was added to the resultant ground powder for granulation. Upon granulation, the resultant granules were compressed into a ring shape. Thereafter, the shaped granules were sintered in an oxygen atmosphere at 1200° C. for 3 hours. The resultant ring-shaped sintered body having an outer diameter of 7.0 mm, an inner diameter of 3.5 mm and a height of 3.0 mm underwent a process of measuring the density of sintered body, the magnetic permeability $\mu$ and the loss factor tan $\delta$ at 25° C. The dielectric constant $\in$ was also measured. The volume resistivity was determined by an insulation resistance meter after a sputtering apparatus was used to press a Cr/Cu film on the upper and lower sides of a disk-shaped sintered body having a diameter of 13 mm and a thickness of 2 mm.

Table 3 shows the evaluation results of the density of sintered body and the volume resistivity as well as the magnetic permeability $\mu$, the loss factor tan $\delta$ and the dielectric constant $\in$ at a frequency of 1 GHz. The density measurement was carried out by using the water displacement method, and the magnetic permeability $\mu$ and the loss factor tan $\delta$ were measured by using the impedance gain/phase analyzer. The dielectric constant $\in$ was measured by using the network analyzer

TABLE 2

| No. | | main component (mol %) | | | | | | Additive component (Weight part) | | | |
|---|---|---|---|---|---|---|---|---|---|---|---|
| | | $Fe_2O_3$ | $BaCO_3$ | $SrCO_3$ | $CO_3O_4$ | NiO | ZnO | $SiO_2$ | $Na_2CO_3$ | $Li_2CO_3$ | $Mn_3O_4$ |
| 7 | Example | 60 | 20 | — | 20 | — | — | 0.4 | 0.2 | — | — |
| 8 | Example | 60 | 20 | — | 20 | — | — | 0.4 | 0.3 | — | — |
| 9 | Example | 60 | 20 | — | 20 | — | — | 0.4 | 0.4 | — | — |
| 10 | Example | 60 | 20 | — | 20 | — | — | 0.4 | 0.6 | — | — |
| 11 | Example | 60 | 20 | — | 20 | — | — | 0.4 | 0.8 | — | — |
| 12 | Example | 60 | 15 | 5 | 20 | — | — | 0.4 | 0.4 | — | — |
| 13 | Example | 60 | — | 20 | 20 | — | — | 0.4 | 0.4 | — | — |
| 14 | Example | 60 | — | 20 | 20 | — | — | 0.4 | 0.6 | — | — |
| 15 | Example | 60 | 20 | — | 5 | 15 | — | 0.4 | 0.4 | — | — |
| 16 | Example | 60 | 20 | — | 10 | 10 | — | 0.4 | 0.4 | — | — |
| 17 | Example | 60 | 20 | — | 20 | — | — | — | — | 0.2 | — |
| 18 | Example | 60 | 20 | — | 20 | — | — | — | — | 0.4 | — |
| 19 | Example | 60 | 20 | — | 20 | — | — | — | — | 0.6 | — |
| 20 | Example | 60 | 20 | — | 20 | — | — | — | — | 1.0 | — |
| 21 | Example | 60 | 20 | — | 20 | — | — | 0.4 | — | 0.3 | — |
| 22 | Example | 60 | 20 | — | 20 | — | — | 0.4 | — | 0.4 | — |
| 23 | Example | 60 | 20 | — | 20 | — | — | 0.4 | — | 0.6 | — |
| 24 | Example | 60 | 20 | — | 20 | — | — | 0.4 | — | 1.0 | — |
| 25 | Comparison Example | 60 | 20 | — | 20 | — | — | — | 0.4 | — | — |
| 26 | Example | 60 | 20 | — | 10 | 10 | — | — | — | 0.4 | — |
| 27 | Example | 60 | 20 | — | 10 | 10 | — | — | — | 0.6 | — |
| 28 | Example | 60 | 20 | — | 20 | — | — | 0.2 | 0.2 | — | — |
| 29 | Example | 60 | 20 | — | 20 | — | — | 0.2 | — | 0.2 | — |
| 30 | Example | 60 | 20 | — | 20 | — | — | 0.2 | — | 0.4 | — |
| 31 | Example | 60 | 20 | — | 20 | — | — | 0.2 | — | 0.6 | — |
| 32 | Example | 60 | 20 | — | 20 | — | — | 0.2 | — | 0.8 | — |
| 33 | Example | 60 | 20 | — | 20 | — | — | 0.2 | — | 1.0 | — |
| 34 | Example | 60 | 20 | — | 15 | — | 5 | 0.4 | 0.4 | — | — |
| 35 | Example | 60 | 20 | — | 10 | — | 10 | 0.4 | 0.4 | — | — |
| 36 | Example | 60 | 20 | — | 20 | — | — | — | — | 0.4 | 0.4 |

TABLE 3

| No. | | Density ($\times 10^3$ kg/m$^3$) | Volume resistivity $\times 10^5$ ($\Omega \cdot$ m) | Magnetic permeability μ (1 GHz) | Loss factor tanδ (1 GHz) | Dielectric constant ε (1 GHz) |
|---|---|---|---|---|---|---|
| 7 | Example | 5.00 | 1.4 | 3.2 | 0.15 | 5.2 |
| 8 | Example | 4.97 | 0.1 | 3.0 | 0.08 | 5.0 |
| 9 | Example | 4.91 | 25.5 | 2.7 | 0.05 | 5.1 |
| 10 | Example | 4.83 | 25.7 | 2.5 | 0.02 | 4.9 |
| 11 | Example | 5.02 | 9.7 | 2.5 | 0.03 | 5.1 |
| 12 | Example | 4.68 | 8.9 | 3.1 | 0.06 | 5.0 |
| 13 | Example | 4.83 | 0.1 | 3.1 | 0.10 | 5.0 |
| 14 | Example | 4.85 | 4.9 | 2.9 | 0.06 | 5.0 |
| 15 | Example | 5.01 | 2016 | 2.6 | 0.04 | 4.1 |
| 16 | Example | 5.00 | 155 | 2.7 | 0.04 | 4.4 |
| 17 | Example | 4.98 | 50.0 | 2.2 | 0.02 | 4.9 |
| 18 | Example | 4.93 | 42.9 | 3.2 | 0.08 | 4.9 |
| 19 | Example | 5.18 | 26.7 | 3.0 | 0.05 | 4.7 |
| 20 | Example | 4.98 | 2.3 | 1.8 | 0.01 | 4.5 |
| 21 | Example | 5.16 | 4.2 | 3.2 | 0.1 | 5.1 |
| 22 | Example | 5.27 | 17.1 | 3.1 | 0.1 | 4.6 |
| 23 | Example | 5.16 | 3.7 | 3.1 | 0.09 | 4.7 |
| 24 | Example | 5.19 | 0.7 | 2.4 | 0.04 | 4.6 |
| 25 | Comparison Example | 4.45 | 43.0 | 2.3 | 0.01 | 4.3 |
| 26 | Example | 4.60 | 14.3 | 2.7 | 0.03 | 4.2 |
| 27 | Example | 4.95 | 8.6 | 2.6 | 0.03 | 4.5 |
| 28 | Example | 4.75 | 3.3 | 2.7 | 0.05 | 4,7 |
| 29 | Example | 4.90 | 0.2 | 3.2 | 0.09 | 4.9 |
| 30 | Example | 5.08 | 6.3 | 2.8 | 0.07 | 4.7 |
| 31 | Example | 5.09 | 5.2 | 2.7 | 0.06 | 4.6 |
| 32 | Example | 5.19 | 5.0 | 2.5 | 0.06 | 4.9 |
| 33 | Example | 4.92 | 4.5 | 2.2 | 0.02 | 4.5 |
| 34 | Example | 4.75 | 3.2 | 3.8 | 0.06 | 5.0 |
| 35 | Example | 4.75 | 4.3 | 6.0 | 0.15 | 5.0 |
| 36 | Example | 5.05 | 32.0 | 3.1 | 0.07 | 4.9 |

As shown in Table 3, by containing SiO$_2$ in combination with Na$_2$CO$_3$ and increasing the amount of Na$_2$CO$_3$, the loss factor tan δ significantly decreased as compared to the case where only SiO$_2$ was contained (Table 1). That is, it has been found that adding Na$_2$CO$_3$ particularly provides an effect of reducing the loss. However, adding only Na$_2$CO$_3$ (No. 25) provides a magnetic permeability μ of about 2.3, but a low density of sintered body and hence insufficient mechanical strength. In contrast, adding Na$_2$CO$_3$ in combination with SiO$_2$ within the range according to this embodiment achieved a low loss level of 0.15 or lower while ensuring a high density of sintered body and a magnetic permeability μ of 2.5 or higher. The hexagonal ferrite material in which Ba was replaced with Sr (No. 12 to 14) and the hexagonal ferrite material in which Co and Ni were mixed (No. 15 and 16) achieved a magnetic permeability μ of 2.5 or higher and a loss factor tan δ of 0.1 or lower, indicating that high magnetic permeability and a low level of loss was attained. In particular, the specimens No. 9, 10 and 15 in which the M1 element was Ba and Na$_2$CO$_3$ in the range from 0.4 to 0.6 weight parts were contained in combination with SiO$_2$ achieved a loss factor tan δ of 0.05 or lower, indicating significant reduction in the loss. Furthermore, the specimens No. 18 and 19 in which the M2 element was Co and only Li$_2$CO$_3$ in the range from 0.4 to 0.6 weight parts were contained achieved a high magnetic permeability of 3.0 or higher and a low loss factor of 0.1 or lower. On the other hand, the examples containing 0.4 to 0.6 weight parts of Li$_2$CO$_3$ in combination with SiO$_2$ exhibited a high density of sintered body of 5.0×10$^3$ kg/m$^3$ or higher and a high magnetic permeability of 2.7 or higher. Moreover, those materials exhibited a low-level dielectric constant ∈ of 6 or smaller, specifically 4.1 to 5.2. All examples exhibited a volume resistivity of 10$^4$ Ωm or higher. The fractured surfaces of the resultant sintered body specimens were observed under the SEM, and there were fewer than one crystal grain having a maximum diameter of 20 μm or greater for each area of 100 μm by 100 μm. That is, even in sintered body having a high density of sintered body, generation of exaggerated grains was suppressed.

Example 2

Sintered body were fabricated as in Example 1 except that the molar ratios of the main components Fe$_2$o$_3$, BaO (BaCO$_3$ was used) and CoO (Co$_3$O$_4$ was used) were 60 mol %, 20 mol % and 20 mol %, respectively, and Li$_2$CO$_3$, CuO and ZnO were contained in the amounts indicated in Table 4 with respect to 100 weight parts of the main components. Table 4 shows the results of measurement of the density of sintered body, the volume resistivity, the magnetic permeability μ, the loss factor tan δ and the dielectric constant ∈ performed as in Example 1.

TABLE 4

| No. | | Li$_2$CO$_3$ (Weight Part) | CuO (Weight Part) | ZnO (Weight Part) | Density × 10$^3$ (kg/m$^3$) | Volume resistivity × 10$^5$ (Ω·m) | Magnetic permeability μ (1 GHz) | Loss factor tanδ (1 GHz) | Dielectric constant ε (1 GHz) |
|---|---|---|---|---|---|---|---|---|---|
| 37 | Example | 0.2 | 0.4 | 0 | 4.84 | 3.4 | 2.8 | 0.05 | 5.1 |
| 38 | Example | 0.2 | 0.6 | 0 | 4.80 | 3.1 | 2.9 | 0.05 | 5.0 |
| 39 | Example | 0.2 | 1.3 | 0 | 5.20 | 0.4 | 2.7 | 0.04 | 5.3 |
| 40 | Example | 0.2 | 1.5 | 0 | 5.30 | 0.2 | 1.5 | 0.01 | 4.7 |
| 41 | Example | 0.4 | 0.4 | 0 | 5.18 | 1.1 | 2.9 | 0.06 | 4.8 |
| 42 | Example | 0.4 | 0.6 | 0 | 5.32 | 0.8 | 2.7 | 0.05 | 4.7 |
| 43 | Example | 0.4 | 1.0 | 0 | 5.13 | 2.0 | 2.8 | 0.04 | 4.9 |
| 44 | Example | 0.4 | 1.5 | 0 | 5.07 | 2.3 | 2.4 | 0.02 | 4.9 |
| 45 | Example | 0.2 | 0 | 0.2 | 4.86 | 1.6 | 2.5 | 0.04 | 5.0 |
| 46 | Example | 0.2 | 0 | 0.6 | 5.08 | 1.0 | 3.1 | 0.07 | 5.0 |
| 47 | Example | 0.2 | 0 | 1.5 | 4.97 | 2.4 | 3.2 | 0.05 | 5.1 |
| 48 | Example | 0.2 | 0 | 2.3 | 5.02 | 3.1 | 2.8 | 0.02 | 5.1 |
| 49 | Example | 0.4 | 0 | 0.2 | 5.10 | 2.6 | 3.0 | 0.05 | 4.8 |
| 50 | Example | 0.4 | 0 | 0.6 | 5.11 | 2.1 | 3.0 | 0.05 | 4.6 |

As a result of the X-ray diffraction study performed on the specimens No. 37 to 50, the constituent phase having a maximum main peak intensity was Y-type ferrite, indicating that the main phase was the Y-type ferrite. As shown in Table 4, by containing 0.2 to 0.4 weight parts of Li$_2$CO$_3$, 0.4 to 1.3 weight parts of CuO and 0.2 to 2.3 weight parts of ZnO, a magnetic permeability μ of 2.5 or higher, a density of sintered body of 4.8×10$^3$ kg/m$^3$ and a loss factor tan δ of 0.08 or lower were achieved. All examples exhibited a volume resistivity of 10$^4$ Ωm or higher. The fractured surfaces of the resultant sintered body specimens were observed under the SEM, and there were fewer than one crystal grain having a maximum diameter of 20 μm or greater for each 100 μm by 100 μm area. That is, even in sintered body having a high density of sintered body, generation of exaggerated grains was suppressed.

Example 3

Some of the materials in Examples 1 and 2 were used to fabricate block-shaped sintered body each of which was machined into a shape having a dimension of 15 mm by 3 mm by 3 mm. Ag—Pt paste was printed and sintered onto the surface of each of the sintered body to fabricate a chip antenna with an electrode having a helical structure configured such that the electrode width and the electrode gap were 0.8 mm and 0.5 mm, respectively, and the number of winding was eight. FIG. 1 shows the exterior of the fabricated chip antenna. Each of the chip antennas was mounted on a substrate and one end of the helical electrode was connected to a feeding electrode. Then, an antenna gain evaluation apparatus using a network analyzer was used to evaluate antenna characteristics (resonant frequency, full width at half maximum of gain). Table 5 shows the evaluation results. As shown in Table 5, each of the chip antennas using the hexagonal ferrite of this example achieved a maximum gain of −10 dB or higher, indicating that the chip antenna using the hexagonal ferrite of this example having a low loss factor tan δ has excellent maximum gain. This means that the chip antenna of this example can not only function as a chip antenna operating in a frequency band of several hundreds of MHz or higher but also achieve a wide band because the base is made of magnetic material having high magnetic permeability and a low dielectric constant. In particular, the specimen No. 10 having a loss factor tan δ of 0.03 or lower achieves a maximum gain of higher than −4.0 dB, showing an excellent antenna characteristic. On the other hand, the chip antenna using the sintered body of Comparison Example 5, which contains only SiO$_2$, contains a large number of exaggerated grains and has a high loss factor tan δ, has poorer maximum gain. From this fact, it is speculated that the presence of the exaggerated grains affects the maximum gain and suppressed generation of exaggerated grains in the hexagonal ferrite of this example contributes to the excellent antenna characteristics.

TABLE 5

| No. | | Magnetic permeability μ (1 GHz) | Loss factor tanδ (1 GHz) | Dielectric constant ε (1 GHz) | Antenna characteristics | |
|---|---|---|---|---|---|---|
| | | | | | Maximum gain (dBi) | Resonant frequency (MHz) |
| 9 | Example | 2.7 | 0.05 | 5.1 | −4.0 | 630 |
| 10 | Example | 2.5 | 0.02 | 4.9 | −3.4 | 670 |
| 12 | Example | 3.1 | 0.06 | 5.0 | −7.2 | 600 |
| 16 | Example | 2.7 | 0.04 | 4.4 | −4.4 | 660 |
| 18 | Example | 3.2 | 0.08 | 4.9 | −8.1 | 590 |
| 19 | Example | 3.0 | 0.05 | 4.7 | −7.5 | 620 |
| 31 | Example | 2.7 | 0.06 | 4.6 | −8.8 | 620 |
| 37 | Example | 2.8 | 0.05 | 5.1 | −8.6 | 620 |
| 39 | Example | 2.7 | 0.04 | 5.3 | −7.8 | 650 |
| 47 | Example | 3.2 | 0.05 | 5.1 | −8.3 | 605 |
| 5 | Comparison Example | 4.0 | 0.24 | 5.0 | −13.5 | 520 |
| 6 | Comparison Example | 7.5 | 0.90 | 4.5 | −18.5 | 400 |

Example 4

Some of the materials in Examples 1 and 2 were used to fabricate block-shaped sintered body each of which was machined into a shape having a dimension of 30 mm by 3 mm by 3 mm so as to fabricate chip antennas as in Example 3 except that the number of winding of the electrode shown in Table 6 was used. Dielectric material having a dielectric constant $\in$ of 21 was similarly machined so as to be 30 by 3 by 3 mm in size to fabricate a chip antenna as in Example 3 except that the number of winding of the electrode shown in Table 6 was used (No. 51). To have the same resonant frequency for all the fabricated chip antennas, the number of winding of the electrode of each of the chip antennas was adjusted. The antenna characteristics (resonant frequency, full width at half maximum of gain and the like) were evaluated as in Example 3. Table 6 shows the evaluation results. As shown in Table 6, it is seen that each of the chip antennas using the hexagonal ferrite of this example having high magnetic permeability, a low loss factor and a low dielectric constant achieves a reduced number of winding of the electrode and an broadened frequency band while maintaining high maximum gain, compared to the chip antenna using the dielectric material.

Example 5

Firstly, for specimens No. 52 to 62, the molar ratios of the main components $Fe_2O_3$, BaO ($BaCO_3$ was used) and CoO ($Co_3O_4$ was used) were set to 60 mol %, 20 mol % and 20 mol %, respectively, and CuO or ZnO was added in the amounts indicated in Table 7 with respect to 100 weight parts of the main components. Then, the above components were mixed in a wet ball mill using water as a medium for 16 hours.

For the specimens No. 52 to 62, the mixed powder was dried and then calcined in the air at 1000° C. for 2 hours. The resultant calcined powder was ground in the wet ball mill using water as a medium for 18 hours. The binder (PVA) in the amount of 1% was added to the resultant ground powder for granulation. Upon granulation, the resultant granules were compressed into a ring shape. Thereafter, the shaped granules were sintered in an oxygen atmosphere at 1200° C. for 3 hours. The resultant ring-shaped sintered body having an outer diameter of 7.0 mm, an inner diameter of 3.5 mm and a height of 3.0 mm underwent a process of measuring the density of sintered body, the magnetic permeability μ and the loss factor tan δ at 25° C. The dielectric constant $\in$ was also measured. The volume resistivity was determined by the insulation resistance meter after the sputtering apparatus was used to press a Cr/Cu film on the upper and lower sides of a disk-shaped sintered body having a diameter of 13 mm and a thickness of 2 mm.

Table 7 shows the evaluation results of the density of sintered body and the volume resistivity as well as the magnetic permeability μ, the loss factor tan δ and the dielectric constant $\in$ at a frequency of 1 GHz. The density measurement was carried out by using the water displacement method, and the magnetic permeability μ and the loss factor tan δ were measured by using the impedance gain/phase analyzer (Model 4291B, Yokogawa-Hewlett-Packard, Ltd.). The dielectric constant $\in$ was measured by using the network analyzer (Model E8364A, Agilent Technologies, Inc.).

TABLE 6

| No. | | Magnetic permeability μ (1 GHz) | Loss factor tanδ (1 GHz) | Dielectric constant $\in$ (1 GHz) | Number of winding (turns) | Antenna characteristics | | |
|---|---|---|---|---|---|---|---|---|
| | | | | | | Resonant frequency (MHz) | Full width at half maximum of gain (MHz) | Maximum gain (dBi) |
| 9 | Example | 2.7 | 0.05 | 5.1 | 12.75 | 650 | 102 | −1.8 |
| 12 | Example | 3.1 | 0.06 | 5.0 | 11 | 650 | 110 | −3.3 |
| 19 | Example | 3.0 | 0.05 | 4.7 | 11 | 650 | 126 | −2.8 |
| 51 | Comparison Example | — | — | 21 | 15.75 | 630 | 90 | −0.3 |

TABLE 7

| No. | | CuO (Weight part) | ZnO (Weight part) | Volume resistivity × $10^5$ (Ω·m) | Density × $10^3$ (kg/m³) | Magnetic permeability μ (1 GHz) | Loss factor tanδ (1 GHz) | Dielectric constant $\in$ (1 GHz) |
|---|---|---|---|---|---|---|---|---|
| 3 | Comparison Example | 0 | 0 | 35.6 | 4.52 | 2.1 | 0.010 | 4.5 |
| 52 | Example | 0.2 | 0 | 31.9 | 5.12 | 2.1 | 0.016 | 4.3 |
| 53 | Example | 0.4 | 0 | 23.3 | 4.82 | 2.2 | 0.017 | 4.6 |
| 54 | Example | 0.6 | 0 | 25.9 | 4.84 | 2.8 | 0.013 | 4.9 |
| 55 | Example | 1.0 | 0 | 2.3 | 4.91 | 2.7 | 0.032 | 5.0 |
| 56 | Example | 1.5 | 0 | 1.1 | 4.92 | 3.1 | 0.041 | 5.0 |
| 57 | Example | 2.0 | 0 | 0.7 | 5.05 | 3.4 | 0.055 | 4.9 |
| 58 | Example | 0 | 0.2 | 41.3 | 5.11 | 2.1 | 0.016 | 4.4 |
| 59 | Example | 0 | 0.4 | 35.1 | 5.09 | 2.2 | 0.019 | 4.5 |
| 60 | Example | 0 | 0.6 | 35.7 | 5.13 | 2.3 | 0.021 | 4.4 |
| 61 | Example | 0 | 1.0 | 2.8 | 5.05 | 2.5 | 0.048 | 5.0 |
| 62 | Example | 0 | 1.5 | 0.6 | 5.03 | 2.8 | 0.062 | 5.0 |
| 6 | Comparison Example | 0 | 0 | 0.1 | 4.45 | 7.5 | 0.900 | 4.5 |

As a result of the X-ray diffraction study performed on the specimens No. 52 to 62, the constituent phase having a maximum main peak intensity was Y-type ferrite, indicating that the main phase was the Y-type ferrite. As shown in Table 7, the specimen No. 3 (Comparison Example) that did not contain CuO or ZnO had a low density of sintered body of $4.52\times10^3$ kg/m$^3$. By containing CuO or ZnO in the Y-type ferrite, the density of sintered body and the magnetic permeability μ were improved while high volume resistivity and low loss factors were maintained. By setting the amount of CuO within the range from 0.1 to 1.5 weight parts with respect to 100 weight parts of the main components according to this example or by setting the amount of ZnO within the range from 0.1 to 1.0 weight parts with respect to 100 weight parts of the main components according to this example, a magnetic permeability μ of 2.1 or higher, a loss factor tan δ of 0.05 or lower, a volume resistivity of $1\times10^5$ Ωm or higher, a density of sintered body of $4.8\times10^3$ kg/m$^3$ or higher and a dielectric constant ∈ of 6 at 1 GHz were achieved, significantly reducing the loss compared to Z-type ferrite. In particular, for the specimens No. 52 to 54 in which the CuO content was in the range from 0.2 to 0.6 weight parts and the specimens No. 58 to 60 in which the ZnO content was in the range from 0.2 to 0.6 weight parts, it is seen that the density of sintered body can be $4.8\times10^3$ kg/m$^3$ or higher while the loss factor tan δ is maintained at 0.03 or lower. For these specimens, a volume resistivity of $1\times10^6$ Ωm or higher was also achieved. These results mean that the hexagonal ferrite according to this example is suitably used in high frequency applications at 1 GHz or higher. The effect of improving the density of sintered body is particularly significant when ZnO is contained, and a density of sintered body of $5.0\times10^3$ kg/m$^3$ or higher is achieved in this case. The fractured surfaces of the resultant sintered body specimens were observed under the SEM, and there were fewer than one crystal grain having a maximum diameter of 20 μm or greater for each 100 μm by 100 μm area. That is, even in sintered body having a high density of sintered body, generation of exaggerated grains was suppressed.

The relationship between the density of sintered body and the sintered body strength of a system containing Cu is shown below by way of example. The sintered body having the composition of each of the above-described No. 3, No. 41 and No. 54, which have different levels of density of sintered body, was cut out into a specimen having a dimension of 2 mm by 3 mm by 15 mm. Each specimen underwent a three-point bending test to evaluate the sintered body strength. The measurement of the test was carried out at a loading rate of 0.5 mm/min using a 7 mm-span jig. The measured sintered body strength showed dependence on the density of sintered body as shown in FIG. 2. It is seen that the sintered body strength improves as the density of sintered body becomes high. The result of FIG. 2 shows that a sintered body strength of 150 MPa can be achieved at $4.6\times10^3$ kg/m$^3$ or higher.

Example 6

Some of the materials in Example 5 were used to fabricate block-shaped sintered body, each of which was machined into a shape having a dimension of 15 mm by 3 mm by 3 mm. Ag—Pt paste was printed and sintered onto the surface of each of the sintered body to fabricate a chip antenna with an electrode having a helical structure configured such that the electrode width and the electrode gap were 0.8 mm and 0.5 mm, respectively, and the number of winding was eight. FIG. 1 shows the exterior of the fabricated chip antenna configured such that the electrode 2 was wound around the ferrite base 1. Each of the chip antennas was mounted on a substrate and one end of the helical electrode was connected to a feeding electrode. Then, the antenna gain evaluation apparatus using a network analyzer was used to evaluate the antenna characteristics (resonant frequency, full width at half maximum of gain). Table 8 shows the evaluation results. As shown in Table 8, each of the chip antennas using the hexagonal ferrite of this example having a low loss factor tan δ achieved a maximum gain of higher than −4 dB, indicating that the chip antenna has excellent maximum gain. This means that the chip antenna of this example can not only function as a chip antenna operating in a frequency band of several hundreds of MHz or higher but also operate in a wide band because the base is made of magnetic material having high magnetic permeability and a low dielectric constant.

TABLE 8

| No. | | Magnetic permeability μ (1 GHz) | Loss factor tanδ (1 GHz) | Dielectric constant ∈ (1 GHz) | Antenna characteristics | |
|---|---|---|---|---|---|---|
| | | | | | Maximum gain (dBi) | Resonant frequency (MHz) |
| 3 | Comparison Example | 2.1 | 0.010 | 4.5 | −4.8 | 700 |
| 54 | Example | 2.8 | 0.013 | 4.9 | −3.1 | 690 |
| 58 | Example | 2.1 | 0.016 | 4.4 | −2.8 | 700 |
| 59 | Example | 2.2 | 0.019 | 4.5 | −3.0 | 700 |
| 6 | Comparison Example | 7.5 | 0.900 | 4.5 | −18.5 | 400 |

Example 7

Some of the materials in Example 5 were used to fabricate block-shaped sintered body, each of which was machined into a shape having a dimension of 30 mm by 3 mm by 3 mm. Then, chip antennas were fabricated as in Example 6 except that the number of winding of the electrode shown in Table 9 was used. The antenna characteristics (resonant frequency, full width at half maximum of gain and the like) were evaluated as in Example 6. Table 9 shows the evaluation results. As shown in Table 9, it is seen that each of the chip antennas using the hexagonal ferrite of this example having high magnetic permeability, a low loss factor and a low dielectric constant ∈ achieves a reduced number of winding of the electrode and an increased gain half width, that is, a wider frequency band while maintaining high maximum gain, compared to the chip antenna using the dielectric material.

TABLE 9

| | | Magnetic permeability μ (1 GHz) | Loss factor tanδ (1 GHz) | Dielectric constant ε (1 GHz) | Number of winding (turns) | Antenna characteristics | | |
|---|---|---|---|---|---|---|---|---|
| No. | | | | | | Resonant frequency (MHz) | Full width at half maximum of gain (MHz) | Maximum gain (dBi) |
| 54 | Example | 2.8 | 0.013 | 4.9 | 13 | 650 | 96 | −1.7 |
| 59 | Example | 2.2 | 0.019 | 4.5 | 12.75 | 650 | 130 | −3.0 |
| 51 | Comparison Example | — | — | 21 | 15.75 | 630 | 90 | −0.3 |

INDUSTRIAL APPLICABILITY

The invention is not limited to a chip antenna but can be applied to antennas of various forms as well as various circuit elements.

DESCRIPTION OF REFERENCE NUMERALS AND SYMBOLS

Explanation of Letters or Numerals

Figure 1:
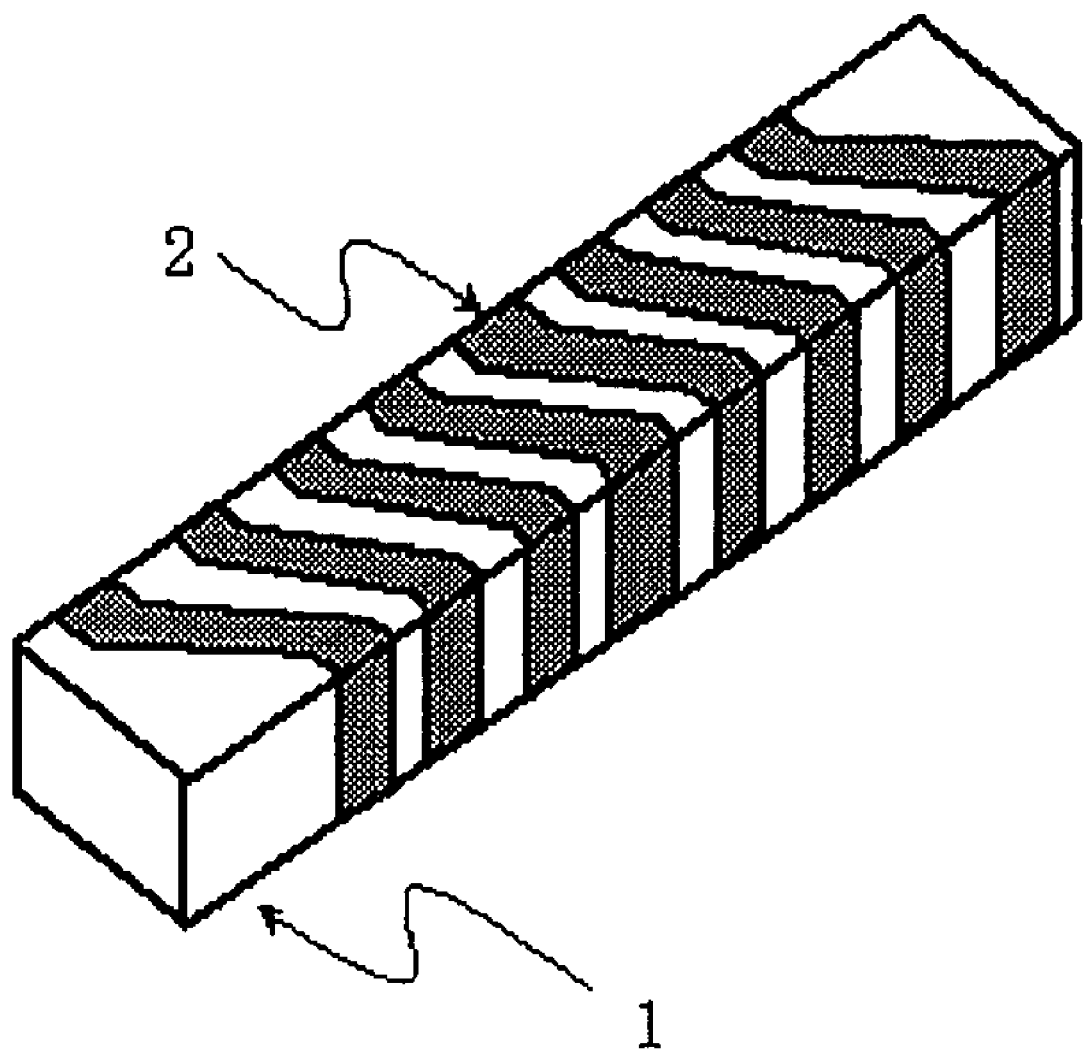
FIG. 1 shows the exterior of a chip antenna showing an embodiment of the antenna according to the invention.
Figure 2:
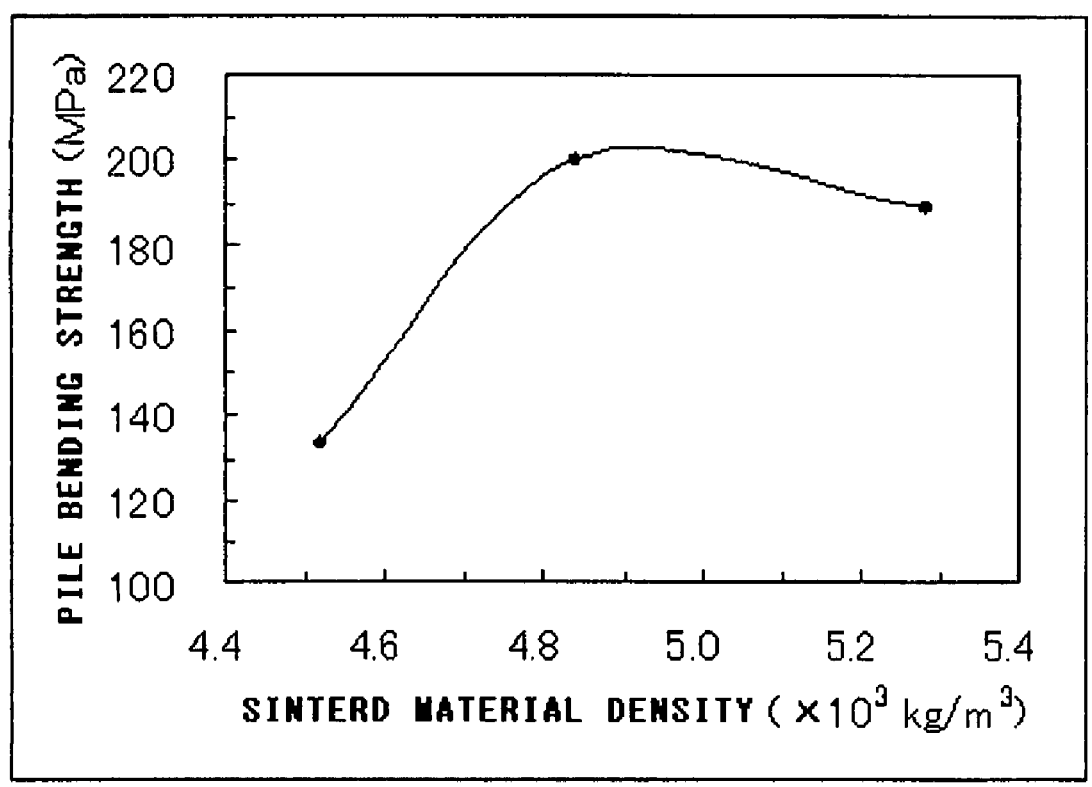
FIG. 2 shows the relationship between the density of a sintered body and the sintered body strength of an embodiment of the hexagonal ferrite according to the invention.
Figure 3:
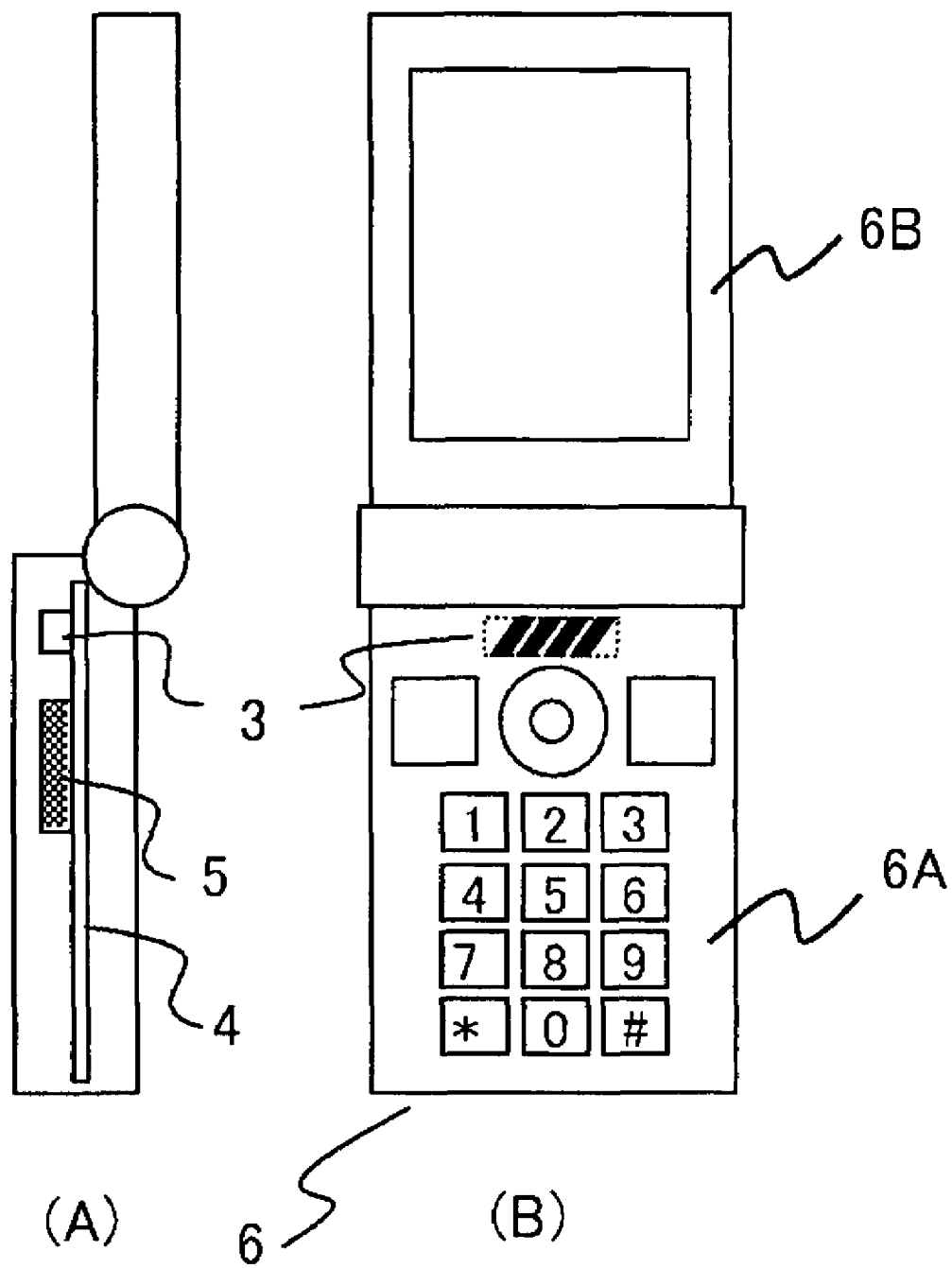
FIGS. 3A and 3B show an embodiment of the communication apparatus of the invention.

1: ferrite base
2: electrode
3: chip antenna
4: substrate
5: wireless module
6: mobile phone
6A: operation unit
6B: display unit

The invention claimed is:

1. A hexagonal ferrite having Y-type ferrite as a main phase the hexagonal ferrite comprising:
    a plurality of main components comprising M1O (M1 stands for at least one of Ba and Sr), M2O (M2 stands for at least one of Co, Ni, Cu, Zn, and Mn), and $Fe_2O_3$; and
    a range of 0.1 to 0.8 weight parts of Li in terms of $Li_2CO_3$ with respect to 100 weight parts of the main components,
    wherein a loss factor and a density of a sintered body comprising said hexagonal ferrite are 0.15 or less at a frequency of 1 GHz and $4.6 \times 10^3$ $kg/m^3$ or greater, respectively.

2. A hexagonal ferrite having Y-type ferrite as a main phase the hexagonal ferrite comprising:
    a plurality of main components comprising M1O (M1 stands for at least one of Ba and Sr), M2O (M2 stands for at least one of Co, Ni, Cu, Zn, and Mn), and $Fe_2O_3$;
    0.2 to 0.4 weight parts of Li in terms of $Li_2CO_3$ with respect to 100 weight parts of the main components; and
    one of 0.4 to 1.3 weight parts of Cu in terms of CuO and 0.2 to 2.3 weight parts of Zn in terms of ZnO with respect to 100 weight parts of the main components,
    wherein a loss factor and a density of a sintered body comprising said hexagonal ferrite are 0.15 or less at a frequency of 1 GHz and $4.6 \times 10^3$ $kg/m^3$ or greater, respectively, and
    wherein the M2 comprises at least one of Co, Ni and Mn.

3. A hexagonal ferrite having Y-type ferrite as a main phase the hexagonal ferrite comprising:
    a plurality of main components comprising M1O (M1 stands for at least one of Ba and Sr), M2O (M2 stands for at least one of Co, Ni, Cu, Zn, and Mn), and $Fe_2O_3$;
    0.1 to 0.4 weight parts of Si in terms of $SiO_2$ with respect to 100 weight parts of the main components; and
    at least one of 0.1 to 0.8 weight parts of Na in terms of $Na_2CO_3$ and 0.1 to 0.8 weight parts of Li in terms of $Li_2CO_3$ with respect to 100 weight parts of the main components,
    wherein a loss factor and a density of a sintered body comprising said hexagonal ferrite are 0.15 or less at a frequency of 1 GHz and $4.6 \times 10^3$ $kg/m^3$ or greater, respectively.

4. An antenna, comprising:
    a base comprising hexagonal ferrite comprising a plurality of main components comprising M1O (M1 stands for at least one of Ba and Sr), M2O (M2 stands for at least one of Co, Ni, Cu, Zn, and Mn), and $Fe_2O_3$; and
    at least one electrode pressed at least one of on a surface of the base and in the base,
    wherein a loss factor and a density of a sintered body comprising said hexagonal ferrite are 0.15 or less at a frequency of 1 GHz and $4.6 \times 10^3$ $kg/m^3$ or greater, respectively.

5. The antenna according to claim 4, wherein the hexagonal ferrite has a magnetic permeability of 2.5 or greater and a dielectric constant of 6 or less at a frequency of 1 GHz.

6. A communication apparatus, comprising:
    the antenna according to claim 5.

7. A hexagonal ferrite having Y-type ferrite as a main phase the hexagonal ferrite comprising:
    a plurality of main components comprising M1O (M1 stands for at least one of Ba and Sr), M2O (M2 stands for at least one of Co, Ni, Cu, Zn, and Mn), and $Fe_2O_3$; and
    0.1 to 1.5 weight parts of Cu in terms of an oxide thereof with respect to 100 weight parts of the main components,
    wherein a loss factor and a density of a sintered body comprising said hexagonal ferrite are 0.15 or less at a frequency of 1 GHz and $4.6 \times 10^3 kg/m^3$ or greater, respectively, and
    wherein the loss factor is 0.05 or less at a frequency of 1 GHz.

8. A hexagonal ferrite having Y-type ferrite as a main phase the hexagonal ferrite comprising:

a plurality of main components comprising M1O (M1 stands for at least one of Ba and Sr), M2O (M2 stands for at least one of Co, Ni, Cu, Zn, and Mn), and $Fe_2O_3$; and
0.1 to 1.0 weight parts of Zn in terms of an oxide thereof with respect to 100 weight parts of the main components,
wherein a loss factor and a density of a sintered body comprising said hexagonal ferrite are 0.15 or less at a frequency of 1 GHz and $4.6 \times 10^3$ kg/m$^3$ or greater, respectively, and
wherein the loss factor is 0.05 or less at a frequency of 1 GHz.

9. The hexagonal ferrite according to claim 7, wherein a volume resistivity is $1 \times 10^5$ Ωm or greater.

10. An antenna, comprising:
a base comprising the hexagonal ferrite according to claim 7; and
at least one electrode pressed at least one of on a surface of the base and in the base.

11. The antenna according to claim 10, wherein the hexagonal ferrite has a dielectric constant of 6 or less and the density of the sintered body is $4.8 \times 10^3$ kg/m$^3$ or greater.

12. A communication apparatus, comprising:
the antenna according to claim 10.

13. An antenna, comprising:
a base comprising the hexagonal ferrite according to claim 1; and
at least one electrode pressed at least one of on a surface of the base and in the base.

14. An antenna, comprising:
a base comprising the hexagonal ferrite according to claim 2; and
at least one electrode pressed at least one of on a surface of the base and in the base.

15. An antenna, comprising:
a base comprising the hexagonal ferrite according to claim 3; and
at least one electrode pressed at least one of on a surface of the base and in the base.

16. The hexagonal ferrite according to claim 8, wherein a volume resistivity is $1 \times 10^5$ Ωm or greater.

17. An antenna, comprising:
a base comprising the hexagonal ferrite according to claim 8; and
at least one electrode pressed at least one of on a surface of the base and in the base.

* * * * *